United States Patent [19]

Hendy et al.

[11] Patent Number: 5,118,766
[45] Date of Patent: Jun. 2, 1992

[54] PROCESS OF PREPARING POLYMER SULPHONYL DERIVATIVES

[75] Inventors: Brian N. Hendy, Middlesbrough; Stella M. Young, Guisborough, both of England

[73] Assignee: Imperial Chemical Industries PLC, London, England

[21] Appl. No.: 383,438

[22] Filed: Jul. 24, 1989

[30] Foreign Application Priority Data

Jul. 28, 1988 [GB] United Kingdom ............... 8818004

[51] Int. Cl.$^5$ ................... C08G 65/40; C08G 75/23; C08G 8/02; C08F 283/00
[52] U.S. Cl. ................... 525/535; 525/328.5; 525/534; 528/125; 528/174; 528/175; 528/126
[58] Field of Search ............ 525/535, 328.5, 534; 528/125, 174, 175, 126

[56] References Cited

U.S. PATENT DOCUMENTS

| | | | |
|---|---|---|---|
| 3,709,842 | 1/1973 | Quentin | 521/53 |
| 4,256,862 | 3/1981 | Binsack et al. | 525/535 |
| 4,268,650 | 5/1981 | Rose | 525/534 |
| 4,273,903 | 6/1981 | Rose | 525/534 |
| 4,414,368 | 10/1983 | Coplan et al. | 525/535 |
| 4,419,486 | 12/1983 | Rose | 525/534 |
| 4,508,852 | 4/1985 | Bikson et al. | 525/535 |
| 4,833,219 | 5/1989 | Guiver et al. | 525/535 |

FOREIGN PATENT DOCUMENTS 2090843 7/1982 European Pat. Off.
0237251 3/1987 European Pat. Off.

Primary Examiner—John Kight, III
Assistant Examiner—P. Hampton-Hightower
Attorney, Agent, or Firm—Cushman, Darby & Cushman

[57] ABSTRACT

A process for making a polymer carrying a plurality of pendant groups $SO_2Z'$ (where $Z'$ is halogen) comprises reacting with an inorganic acid halide a substantially waterinsoluble derivative of the corresponding polymer sulphonic acid with cations of valency 2, 3 or 4. The process is especially useful when the polymer sulphonic acid is one which in free acid form or monovalent cation salt form is soluble in or heavily swollen by water at temperatures in the range 0°–30° C. Suitably the polymer sulphonic acid is derived from a polyarylether-sulphone or -ketone or -sulphone/-ketone copolymer containing dioxyphenylene groups.

13 Claims, No Drawings

PROCESS OF PREPARING POLYMER SULPHONYL DERIVATIVES

This Invention relates to polymer sulphonyl derivatives and in particular to a process for making them.

According to the invention a process for making a polymer carrying a plurality of groups SO₂Z' (where Z' is halogen) comprises reacting with an inorganic acid halide a substantially water-insoluble derivative of the corresponding polymer sulphonic acid with cations of valency 2, 3 or 4.

The polymer sulphonic acid can be for example a polyalkene, polystyrene, polyarylether, or (especially) a polyarylether-sulphone or -ketone or -sulphone/- ketone copolymer. In the following description the term "ether" is to be understood as incuding thio-ether and mixed ether-thioether unless the opposite is stated. The molecular weight of the polymer (not counting sulphonic substituents) can be for example from 1000 up to the limit dictated by viscosity too high to permit ready handling; for the above-mentioned poly arylether-sulphones and -ketones and copolymers it is typically in the range 2000 to 100000, especially 5000 to 60000. These molecular weights correspond to reduced viscosities (1 g polymer in 100 cm³ of solution) in the range 0.05 to 2.0, especially 0.15 to 1.5, measured on the polymers before sulphonation.

The invention is especially applicable to polyarylethers, particularly polyarylether-sulphones and ketones and sulphone-ketone copolymers, in which the polymer chain contains readily sulphonatable aromatic rings free of deactivating groups, for example phenylene with 2 ether links, biphenylene with 2 ether links on the same or different benzene rings and bis phenyl alkanes. In such phenylene containing polymers, the phenylene rings are normally monosulphonated if for example the ether links are mutually ortho or para, disulphonated if they are mutually meta. A preferred range of sulphonatable polymers consists essentially of the repeating units

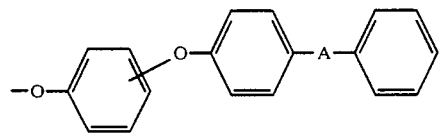

alone or with units

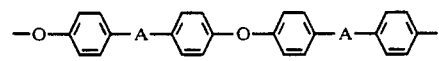

From them sulphonated polymers having differing sulphonic acid contents can be made by choosing the relative proportions of units I and II in the polymer subjected to sulphonation. Sulphonation is rapid at room temperature in 98% w/w sulphuric acid when groups A are all SO₂ but is slower and can be more readily controlled in conventional ways, such as by time and temperature, the greater the proportion of groups CO in positions A.

The invention is applicable especially to polymer sulphonic acids that in free acid form or monovalent cation salt form are soluble in or heavily swollen (over 100% w/w) by water at temperatures in the range 0°–30° C. Such polymers cannot conveniently, if at all, be separated from a sulphuric acid sulphonation reaction mixture by dilution with water, and cannot be easily dried to the extent desirable before the reaction with inorganic acid halide. In particular, the starting polymer sulphonic acid consists of units I alone or with units II as above, in which the dioxyphenylene group of unit I is sulphonated, and sulphonated unit I is present to the extent by moles of at least 80, especially at least 95, percent of the total of I and II.

The process may include the preceding steps of converting the corresponding sulphonic acid or monovalent cation salt to the substantially water-insoluble derivative with the cation of valency 2, 3 or 4 and separating that derivative. It may further include the preliminary step of sulphonating a corresponding sulphonatable polymer. If such a preliminary step is effected using concentrated sulphuric acid, as for example when the starting polymer consists of units I alone or with units II, it is usually followed by dilution with water to precipitate polymer sulphonic acid. Unreacted sulphuric acid can, if desired, be removed by washing with water or neutralised with alkali but, to a greater extent the higher the sulphonic acid content of the polymer, complete removal or neutralisation is preferably avoided. This is because the precipitate becomes soluble or so highly swollen that it cannot be handled. Using other sulphonating agents, for example sulphur trioxide or chlorosulphonic acid, the reacted mixture usually contains an organic solvent such as a halogenated hydrocarbon. If such a mixture is worked up by mixing with water, the solvent forms a separate liquid layer. A salt providing the cations of valency 2, 3 or 4 can be added to the polymer sulphonic acid before during or after the mixing with water. A particular advantage of forming the cation derivative is that this can be separated in washable form from the water-diluted mixture still containing a considerable quantity of sulphuric acid or from the solution or highly swollen polymer gel.

The cation is preferably one or more metals. Suitable divalent metals are magnesium, copper and ferrous iron. Suitable trivalent metals are aluminium, ferric iron and chromium. Cations of more than one metal, possibly differing in valency, can be used if desired.

The derivative of the polymer sulphonic acid with the cation of valency 2, 3 or 4 can be obtained by reacting the polymer sulphonic acid in its acid or monovalent cation salt form, for example a salt of a monovalent metal and/or monovalent onium by heating at 50° C. or over in the presence of a salt providing the required cations to form a material less soluble, preferably essentially insoluble, in water. Heating is preferably at 60° C. or over but in general temperatures substantially over 100° C. are unnecessary. If a solution of the starting sulphonated polymer is used, addition of an aqueous solution of the polyvalent salt at ambient temperature results either in a clear solution or a thin, milky, colloidal precipitate; such a milky solution is preferably clarified by addition of a trace of acid. Heating the mixture results in the formation of a precipitate which is readily filtered. It is preferred to use an excess of polyvalent salt relative to the sulphonic acid and sulphonate groups, particularly at least four, especially at least eight, equivalents. Since the derivative is substantially insoluble in water, contains (by analysis) no free water and is formed by precipitation from a solution containing polymer sulphonate ions and hydrated metal ions (that is, of the metal salt of the polymer sulphonic acid), it is believed not to be a salt.

The starting sulphonated polymer may be in solution in for example water, aqueous acetone or aqueous methanol, or in solid form, for example a coating on a support, for example a porous support.

If the sulphonated polymer is in solid form, particularly a coating on a porous support, it may be immersed in a solution of the polyvalent salt and heated to the desired temperature, the concentration and volume of the solution being sufficient to provide the desired excess of the metal ion.

In the conversion to polymer sulphonyl halide the inorganic acid halide can be for example $POCl_3$, $PCl_3$, or phosgene. Conveniently a thionyl halide, especially chloride, is used. Preferably the inorganic halide is in excess; thionyl chloride also serves as the reaction solvent. A weak tertiary organic base, typically no stronger than aniline, is preferably present. Examples are pyridine, alkylpyridines and quinolines. Very suitably the base contains oxygen, which may be present as part of an electron-withdrawing group, especially acyl. The quantity of the base is for example 60 to 200 especially 100–120 mole % calculated on the sulphonate groups of the polymer sulphonic acid. Examples are dialkylamides of aliphatic carboxylic acids containing up to 6 carbon atoms in all. Such bases are preferably liquids at ambient temperature. A convenient base is dimethylformamide or dimethylacetamide. In such amide bases each nitrogen is considered to contribute 1 mole of basic function. It appears that the base forms a complex with the acid halides present.

After reaction with the inorganic acid halide, the reaction mixture is worked up by contacting it with a liquid in which the polymer sulphonyl halide is insoluble but unwanted materials are soluble. This can be cold water or ice, but preferably is one or more substantially water-free organic liquids. Preferably the volume of diluent is sufficient to afford a dilution factor (total weight divided by weight of starting polymer) of at least 1000 especially at least 5000. It is important that residues of the organic base, which might attract water vapour from the atmosphere and/or promote a side reaction with $SO_2Z'$ groups leading to $SO_2OH$ group formation, be removed. In particular the organic base should be at a very low level or indeed absent once the inorganic halide and the hydrogen halide byproduct have been removed. This is because such base, which catalyses the reaction of the inorganic halide, is also a catalyst for the reaction of the polymer sulphonyl halide with water. Therefore also contacting with the liquid is effected preferably with vigorous agitation. Use of the substantially water-free liquid makes possible the production of polymer sulphonyl halide in which at least 75, especially at least 90, % of the total sulphonyl groups are halide as described in our co-pending European application 89301220.

The organic liquid should not significantly dissolve the polymer sulphonyl halide, but should dissolve any inorganic acid halide left over after reaction, the inorganic products of reaction, and also the base added as catalyst. A suitable liquid is a C1–C6 oxygenated hydrocarbon, such as an alcohol preferably secondary or tertiary; although it is capable of reaction with the polymer sulphonyl halide, this reaction is too slow to be significant at temperatures under about 15° C. Preferably more than one organic liquid is used, and they are chosen so as to be mutually soluble. A suitable combination is an alcohol, especially a propanol, for the first contacting stage(s), followed by a volatile hydrocarbon or halogenated hydrocarbon (bp in range 30°–140° C.) for subsequent stage(s), in which the alcohol is removed; the second liquid should not, of course, dissolve or swell the polymer.

The sulphonyl halide can be isolated from the last wash stage by drying. If the polymer consists essentially of units I and II carrying sulphonyl halide groups at at least the preferred level, it shows the characteristic property of solubility in tetrachloroethane at preferred low sulphonic acid contents. Nitrobenzene is a suitable solvent for the generality of polymer sulphonyl halides provided by the process of the invention. The polymers are also soluble in polar organic liquids such as THF, DMSO and DMF and mixtures thereof. They can be fabricated into membranes for example by solvent casting.

The product of the process can be converted to a sulphonamide by reaction with an amine. Such reaction is carried out in a solvent which is polar but effectively inert, for example an aromatic nitro-compound, suitably nitrobenzene. A basic compound can be present to take up the hydrogen halide formed in the reaction. The basic compound is conveniently an excess of the reactant amine or is a tertiary amine or an inorganic reagent.

The amine has the general formula $NR_2H$, in which either or both Rs can be H or hydrocarbon or substituted hydrocarbon. When R is hydrocarbon, it can be for example aliphatic, especially with up to 20, typically up to 6, carbon atoms per R. If any such R is aromatic, it can be for example a derivative of benzene, naphthalene or biphenyl. Any two Rs can be the same or different and can be joined to form a ring. If R is a substituted hydrocarbon, the substituents can be for example halogen, hydroxy, alkoxy, aryloxy, amino, alkylamino, arylamino, and the substituents may join Rs to form a heterocyclic ring, as for example in morpholine. Certain polymers in which the substituent(s) on R are amino groups are the subject of our co-pending European application 89301220.

The product of the process can be converted to an ester by reaction with an alcohol or phenol of formula HOD, in which D can be hydrocarbon or substituted hydrocarbon group defined in the same way as R in the amine.

In the preferred starting polyarylether sulphonic acid the percentage of sulphonatable aromatic rings carrying at least one sulphonic group is conveniently over 70, especially at least 80. Lower percentages for example down to 20 or even 2, for special uses, are more readily obtained when linkage A is CO. These proportions apply equally to the corresponding polymer sulphonyl halides made by the process of the invention and to amides and esters produced therefrom.

The polyarylether sulphonyl halide are chiefly of value as chemical intermediates. They can be formed into shaped articles or coatings or membrane; these are hydrophobic but, being reactive, can be rendered hydrophilic and are then suitable for separation technologies such as ion-exchange, reverse osmosis and ultrafiltration. Similar applications are envisaged for membranes formed from corresponding pre-synthesised amides and esters.

The invention is illustrated by the following Examples.

EXAMPLE 1

A sample (285 g) of polymer (RV 1.26) consisting of the repeating unit I (A=SO$_2$) was sulphonated by dissolving it in 98% w/w sulphuric acid and stirring at 25° C. overnight. The reacted mixture was drowned in 10 times its volume of ice and water, as a result of which the polymer sulphonic acid formed a precipitate. The precipitate was separated and washed with changes of cold water until it became a soft gel. The soft gel was suitable for dissolving in warm water to form the solution to be used in the next stage, but on this occasion was freed of residual sulphuric acid by ion exchange, then dried and put into storage. RV 2.12 in DMF.

A sample of the dry polymer (60 g) was dissolved in 1.5 l of demineralised water with heating. The solution was cooled to room temperature and a solution of aluminium sulphate (150 g in 400 ml) was added. The mixture was heated to 70°-80° C. with vigorous stirring; precipitation of the aluminium derivative occurred; the suspension was taken almost to boiling and then allowed to cool to room temperature still stirring. The ppt was filtered, washed twice with boiling water and dried at 90° C. in vacuo overnight.

Yield 53.3 g (87%).

Al % 1.89 (theoretical 2.18%).

Aluminium derivative (25 g) was allowed to dissolve in thionyl chloride (300 ml) and DMF (8 ml) at 50° C. overnight in a nitrogen stream. The resulting solution was filtered into a pressure-equalised dropping funnel and slowly dripped into vigorously agitated dry isopropanol (IPA) (1.5 l) at under 10° C. The precipitate was filtered, filter-washed with cold IPA, slurried in cold IPA, filtered, filter washed with pet ether (60°-80° C.), stirred in 1.5 l pet ether (60°-80° C.) for 45 mins, filtered, filter wash with pet ether (60°-80° C.). This washing was repeated three times with pet ether (40°-60° C.). The product was dried at 80° C. in vacuo under nitrogen.

Yield 21 g (80%).

The product was soluble in 1,1,2,2 tetrachloro ethane and nitrobenzene.

In a flow of nitrogen a sample of polyarylethersulphonyl chloride so formed (19.0 g) was added to dry nitrobenzene (140 ml) and the mixture was stirred and heated to 50° C. until almost all the solid had dissolved. The solution was filtered to remove any traces of undissolved sulphonyl chloride, then fed over 20 min into a solution of 1-amino-3-dimethylaminopropane (4.8 g) in DMF (140 ml). The mixture was held at 40° C. for 3 h. Then a solution of excess methyl iodide in DMSO was added. The mixture was held at 50° C. for 5 h, then run out into 1,1,1-trichloroethane. The precipitate was slurried in cold water, then in hot water, then washed 4 times with IPA, sucked dry and dried overnight in vacuo at 85° C. The resulting polymer sulphonylaminopropyltrimethylammonium iodide had RV 2.21 in DMF. It appeared to be similar in purity to the product obtained from the polymer sulphonic acid, except for an Al content of 25 ppm w/w.

EXAMPLE 2

Conversion of Sulphonated Polymer Containing Residual H$_2$SO$_4$ to Al derivative A solution of the polymer used in Example 1 (20 g) containing unreacted H$_2$SO$_4$ (200 ml) (made in fact by dissolving the dry sulphonated polymer in the H$_2$SO$_4$) was drowned in demineralised water, from which the polymer precipitated in bead form. The beads were washed with water (2 or 3 changes) until highly swollen, then dissolved in water by heating. The solution was cooled to room temperature. A solution of aluminium sulphate (6 equivalents) in water (100 ml) was added. The mixture (free of turbidity) was heated with stirring at 75°-80° C. until precipitation was complete. The precipitate was collected on a filter, washed with boiling water until the washings were free of sulphate (Ba Cl$_2$ test), then dried at 40° C. for one week. It was a finely divided solid (17.7 g, yield 87%).

A sample of it was dissolved in thionyl chloride+DMF (this took 40 mins at 50° C.) and converted to polymer sulphonyl chloride as in Example 1.

EXAMPLE 3

MAGNESIUM DERIVATIVE

A sample (20 g) of the dry polymer used in Example 1 was dissolved in 1 liter of warm water and cooled. A solution of magnesium sulphate heptahydrate (10 equivalents) in 500 ml of water was added. The solution became slightly turbid but was clarified by adding a trace of H$_2$SO$_4$. It was heated to boiling, held at 77° C. until precipitation was complete, then cooled. The precipitate was collected on a filter, washed free of sulphate and dried in vacuo at 85° C. It was a white solid (15.3 g, yield 75%) with Mg content 2.48% (theoretical 2.92%).

A sample (10 g) of this magnesium derivative was dissolved in thionyl chloride (200 ml, with 8 ml DMF) (this took 48 h). The resulting clear orange solution was worked up as in Example 1. The yield of polymer sulphonyl chloride was 5.8 g (57%).

EXAMPLE 4

Polyaryletherketone

To sample (16.1 g) of sulphonated polymer consisting of repeating unit I (A=CO) dissolved in 1 liter of water was added a solution of aluminium sulphate (46 g as anhydrous salt) in 500 ml of water. The mixture was heated at 75° C. until precipitation was complete. The precipitate, a red solid, was recovered as in Example 1.

Yield 15.7 g (95%).

Al content 2.00% (theoretical 2.39%).

A sample (9.3 g) of the solid was dissolved at 50° C. in thionyl chloride (200 ml with 8 ml DMF) (this was complete overnight). The resulting clear red solution was worked up as in Example 1. The yield of polymer sulphonyl chloride was 8.5 g (87%).

The polymer sulphonyl chloride was dissolved in nitrobenzene (56 ml) under nitrogen at 50° C., filtered, and dripped into a solution of N,N',N'-trimethylethylenediamine (2.75 ml) in DMF (64 ml). The mixture was stirred at 50° C. for 3 h, during which time it became clear of its initial cloudiness, then a solution of methyl iodide (12.5 ml) 10 in DMF (32 ml) was added. The mixture was stirred overnight at 50° C., then allowed to cool. The quaternary aminoalkylamide iodide was recovered in substantially quantitative yield.

We claim:

1. In a process for making a polymer carrying a plurality of pendant groups of formula:

—SO$_2$Z' wherein Z' is halogen, by reacting:

(a) an inorganic acid halide; and (b) a corresponding polymeric sulphonic acid having pendant groups of formula —SO$_3$H, so that the pendant —SO$_3$H groups are converted to —SO$_2$Z' groups, the improvement which comprises replacing the acid reactant (b) with a substantially water-insoluble polymeric sulphonic acid derivative, said derivative comprising cations selected from the group of cations having a valency of 2, 3 or 4 which renders said derivative substantially water-insoluble.

2. A process according to claim 1 in which the said corresponding polymer sulphonic acid is one which in free acid form or monovalent cation salt form is soluble in or heavily swollen by water at temperatures in the range 0°–30° C.

3. A process according to claim 1 in which the polymer sulphonic acid is derived from a polyarylether-sulphone or -ketone or -sulphone/ -ketone copolymer.

4. A process according to claim 3 in which the polymer sulphonic acid consists of the units

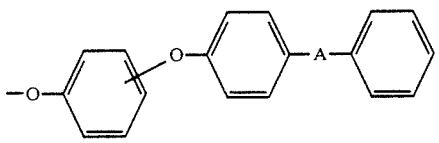

alone or with units

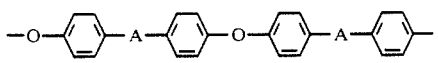

in which the dioxyphenylene group of unit I is sulphonated, and sulphonated unit I is present to the extent by moles of at least 80 percent of the total of I and II.

5. A process according to claim 1 in which the cation is one or more of aluminium, ferric iron or chromium.

6. A process according to claim 1 including the preceding steps of reacting the polymer sulphonic acid in its acid or monovalent cation form by heating at 50° C. or over in the presence of a salt providing the required cations of valency 2, 3 or 4 and separating the resulting derivative.

7. A process according to claim 6 including the preliminary steps of sulphonating a corresponding sulphonatable polymer, diluting the resulting product with water and incompletely removing unreacted sulphuric acid from the resulting mixture.

8. A process according to claim 1 in which the reaction with the inorganic acid halide is carried out in the presence of a weak organic tertiary base.

9. A process according to claim 1 in which the product of reaction the derivative with the inorganic acid halide is worked up by contacting it with one or more substantially water-free organic liquids.

10. A process according to claim 9 which comprises contacting the said product with an alcohol and then with a volatile hydrocarbon or halogenated hydrocarbon.

11. In a process for making a polymer selected from the group consisting of polyarylether sulphone, polyarylether ketone and polyarylether sulphone and ketone copolymer, the polymer carrying a plurality of pendant groups of formula:

—SO$_2$Z' wherein Z' is halogen, by reacting:
(a) an inorganic acid halide; and
(b) a corresponding polymeric sulphonic acid having pendant groups of formula —SO$_3$H, so that the pendant —SO$_3$H groups are converted to —SO$_2$Z' groups, the improvement which comprises replacing the acid reactant (b) with a substantially water-insoluble polymeric sulphonic acid derivative, said derivative comprising cations selected from the group of cations having a valency of 2, 3 or 4 which renders said derivative substantially water-insoluble.

12. In a process for making a polymer carrying a plurality of pendant groups of formula:

—SO$_2$Z' wherein Z' is halogen, by reacting:
(a) an inorganic acid halide; and
(b) a corresponding polymeric sulphonic acid having pendant groups of the formula —SO$_3$H or a monovalent cation form so that the pendant —SO$_3$H groups or corresponding cation groups are converted to —SO$_2$Z' groups,
the improvement which comprises reacting the acid reactant (b) or the monovalent cation form with a salt providing cations of valency selected from the group consisting of 2, 3 and 4 in aqueous solution to form a corresponding polymeric sulphonic acid derivative, said derivative comprising cations selected from the group of cations having a valency of 2, 3 or 4 which renders said derivative substantially water-insoluble; isolating said polymeric sulphonic acid derivative from aqueous solution; and using said isolated derivative as a replacement for acid reactant (b).

13. In a process for making a polymer carrying a plurality of pendant groups of formula:

—SO$_2$Z' wherein Z' is halogen, by:
(a) sulphonating a corresponding sulphonatable polymer with sulphuric acid to form a corresponding polymeric sulphonic acid having pendant groups of formula —SO$_3$H,:
(b) diluting the product of (a) with water to form a mixture;
(c) incompletely removing unreacted sulphuric acid from the mixture of (b);
(d) reacting the product of (c) with an inorganic acid halide so that the pendant —SO$_3$H groups are converted to —SO$_2$Z' groups,
the improvement which comprises reacting the product of (c) with a salt providing cations of valency selected from the group consisting of 2, 3 and 4 in aqueous solution to form a corresponding polymeric sulphonic acid derivative, said derivative comprising cations selected from the group of cations having a valency of 2, 3 or 4 which renders said derivative substantially water-insoluble; isolating said polymeric sulphonic acid derivative from aqueous solution; and using said isolated derivative as a replacement for the product of (c) in step (d).

* * * * *